US011413812B2

(12) United States Patent
Beh et al.

(10) Patent No.: US 11,413,812 B2
(45) Date of Patent: Aug. 16, 2022

(54) FLUID SUPPORT CONTINUOUS THREE-DIMENSIONAL PRINTER

(71) Applicant: AGENCY FOR SCIENCE, TECHNOLOGY AND RESEARCH, Singapore (SG)

(72) Inventors: Weijie Cyrus Beh, Singapore (SG); Yiqi Seow, Singapore (SG); Sau Yin Chin, Singapore (SG)

(73) Assignee: AGENCY FOR SCIENCE, TECHNOLOGY AND RESEARCH, Singapore (SG)

( * ) Notice: Subject to any disclaimer, the term of this patent is extended or adjusted under 35 U.S.C. 154(b) by 226 days.

(21) Appl. No.: 16/498,808

(22) PCT Filed: Mar. 29, 2018

(86) PCT No.: PCT/SG2018/050165
§ 371 (c)(1),
(2) Date: Sep. 27, 2019

(87) PCT Pub. No.: WO2018/182536
PCT Pub. Date: Oct. 4, 2018

(65) Prior Publication Data
US 2021/0162656 A1    Jun. 3, 2021

(30) Foreign Application Priority Data
Mar. 30, 2017  (SG) .............................. 10201702635Y

(51) Int. Cl.
*B29C 64/129*    (2017.01)
*B33Y 10/00*    (2015.01)
(Continued)

(52) U.S. Cl.
CPC .......... *B29C 64/129* (2017.08); *B29C 64/245* (2017.08); *B29C 64/255* (2017.08);
(Continued)

(58) Field of Classification Search
CPC ... B29C 64/129; B29C 64/245; B29C 64/255; B29C 64/268; B29C 64/273; B29C 64/286
See application file for complete search history.

(56) References Cited

U.S. PATENT DOCUMENTS

2010/0125356 A1*  5/2010  Shkolnik ................. G06T 5/006
                                                    700/98
2015/0165678 A1*  6/2015  Ding ..................... B29C 64/255
                                                    425/150
(Continued)

FOREIGN PATENT DOCUMENTS

| CN | 104210109 A | 12/2014 |
| CN | 106182767 A | 12/2016 |
| WO | WO-93/20993 A1 | 10/1993 |

OTHER PUBLICATIONS

Search Report and Written Opinion in International Application No. PCT/SG2018/050165 dated Jun. 4, 2018, 13 pages.

*Primary Examiner* — Joseph S Del Sole
*Assistant Examiner* — Jamel M Nelson
(74) *Attorney, Agent, or Firm* — Marshall, Gerstein & Borun LLP

(57) ABSTRACT

Systems and methods for continuous printing of a three-dimensional (3D) object are provided. The system includes a resin tank, an optical image source, a support fluid reservoir and a pumping structure. The resin tank is where the 3D object is printed and includes a print bed to form a base of the 3D object. The optical image source modulates light in accordance with a 3D image to vary a degree and pattern of crosslinking in a photocrosslinkable resin in the resin tank. The support fluid reservoir is in fluid communication with the resin tank and includes a support fluid which is immiscible with the photocrosslinkable resin. And the pumping structure is configured to transfer the support fluid from the
(Continued)

support fluid reservoir to the resin tank such that the support fluid rises in the resin tank at a same rate as vertical height of a top of the 3D object as the 3D object is printed on the print bed.

18 Claims, 6 Drawing Sheets

(51) Int. Cl.
  *B33Y 30/00* (2015.01)
  *B33Y 70/00* (2020.01)
  *B29C 64/245* (2017.01)
  *B29C 64/255* (2017.01)
  *B29C 64/286* (2017.01)
  *B29C 64/268* (2017.01)

(52) U.S. Cl.
  CPC .......... *B29C 64/268* (2017.08); *B29C 64/286* (2017.08); *B33Y 10/00* (2014.12); *B33Y 30/00* (2014.12); *B33Y 70/00* (2014.12)

(56) References Cited

U.S. PATENT DOCUMENTS

| | | | |
|---|---|---|---|
| 2016/0046072 A1* | 2/2016 | Rolland | B33Y 10/00 |
| | | | 264/401 |
| 2016/0200042 A1* | 7/2016 | Jeng | B29C 64/124 |
| | | | 264/494 |
| 2016/0368210 A1* | 12/2016 | Chen | B29C 64/106 |
| 2017/0036403 A1* | 2/2017 | Ruff | C09D 109/08 |

\* cited by examiner

FLUID SUPPORT CONTINUOUS THREE-DIMENSIONAL PRINTER

PRIORITY CLAIM

This application claims priority from Singapore Patent Application No. 10201702635Y filed on 30 Mar. 2017.

TECHNICAL FIELD

The present invention generally relates to three-dimensional (3D) printing, and more particularly relates to methods and systems for 3D printing of soft materials.

BACKGROUND OF THE DISCLOSURE

Three-dimensional (3D) printers are finding applications in many fields. In biomedical applications, an area of particular interest is using 3D printers to print three-dimensional soft material. Since human organs and tissues are made up, primarily, of gel-like materials. soft materials such as hydrogels have been an important area of research. Two obvious areas in which soft materials can be beneficial are tissue engineering and regenerative medicine applications and wound dressing applications.

For tissue engineering, gels are the preferred scaffolding material because of the ability to culture cells in them and because of the favorable transport properties that can allow effective delivery of nutrients and clearance of waste. In addition, since most tissues begin their development in gel-like matrices, the use of hydrogels gives tissue engineers a chance to recapitulate the mechanical properties of the microenvironment, which has been shown to be important for achieving functional tissues.

Gels have also been employed in wound dressings because of their ability to provide mechanical protection without stressing the wound bed. In particular, a large number of advanced dressings for chronic wounds have been developed for their ability to maintain moisture balance by absorbing wound exudates. However, in these cases, the size, depth and complex geometry of the wound beds can pose a challenge for traditional dressings that are often manufactured in sheets.

In these applications, the ability to manufacture soft materials in arbitrary shapes can be invaluable. Additive manufacturing methods such as 3D printing are uniquely suited for such applications. However, 3D printing technologies have traditionally been based on a fused deposition modeling (FDM) method or on a stereolithography (SLA) method. Both methods are capable of high spatial control and resolution. However, the need to actuate the extrusion nozzle or laser spot across a two-dimensional plane and then stepping through each Z-layer severely limits the print speed. Furthermore, existing 3D printers are typically designed for rigid materials and are not compatible with soft structures.

The few experimental systems that are designed for soft materials typically use a filament extrusion method similar to FDM. Yet, the slow print speed makes their adoption in a clinic or hospital environment impractical. Speed is a particularly pertinent issue for chronic wounds as dressing changes can be as frequent as every other day.

Thus, what is needed is methods and systems for 3D printing suitable for printing of soft material and soft structures which at a print speed faster than current methods and systems. Furthermore, other desirable features and characteristics will become apparent from the subsequent detailed description and the appended claims, taken in conjunction with the accompanying drawings and this background of the disclosure.

SUMMARY

According to at least one aspect of the present embodiments, a system for printing a three-dimensional (3D) object is provided. The system includes a resin tank, an optical image source, a support fluid reservoir and a pumping structure. The resin tank is where the 3D object is printed and includes a print bed to form a base of the 3D object. The optical image source modulates light in accordance with a 3D image to vary a degree and pattern of crosslinking in a photocrosslinkable resin in the resin tank. The support fluid reservoir is in fluid communication with the resin tank and includes a support fluid which is immiscible with the photocrosslinkable resin. And the pumping structure is configured to transfer the support fluid from the support fluid reservoir to the resin tank such that the support fluid rises in the resin tank at a same rate as vertical height of a top of the 3D object as the 3D object is printed on the print bed.

According to another aspect of the present embodiments, a method for continuous printing of a three-dimensional (3D) object is provided. The method includes modulating light projected from an optical image source through a vertically displaceable screen to vary the degree and pattern of crosslinking in a photocrosslinkable resin placed in a resin tank as the vertically displaceable screen is displaced away from a print bed in the resin tank. The method further includes transferring a support fluid from a support fluid reservoir to the resin tank such that the support fluid rises in the resin tank at the same rate as the screen is vertically displaced away from the print bed.

BRIEF DESCRIPTION OF THE DRAWINGS

The accompanying figures, where like reference numerals refer to identical or functionally similar elements throughout the separate views and which together with the detailed description below are incorporated in and form part of the specification, serve to illustrate various embodiments and to explain various principles and advantages in accordance with present embodiments.

FIG. 1, comprising FIGS. 1A, 1B and 1C, depicts illustrations of systems for three-dimensional (3D) printing in accordance with a present embodiment wherein FIG. 1A depicts a cross-sectional planar view of the system for using a light source for an optical image source, FIG. 1B depicts a cross-sectional planar view of the system for using a laser beam for the optical image source, and FIG. 1C depicts a cross-sectional planar view of the system when not using a screen.

And FIG. 3, comprising FIGS. 3A and 3B, depicts illustrations of 3D closed contour print outs in accordance with the present embodiment wherein FIG. 4A depicts disadvantages of a solid print bed and FIG. 4B depicts a print bed in accordance with the present embodiment.

Skilled artisans will appreciate that elements in the figures are illustrated for simplicity and clarity and have not necessarily been depicted to scale.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description. It is the intent of the present embodiment to present methods and systems for three-dimensional (3D) printing which enable rapid printing of soft gel material. In accordance with a present embodiment a thin crosslinkable resin layer is maintained throughout the printing, thereby permitting continuous (and hence rapid) printing of soft gel material. In addition, a liquid support for the thin crosslinkable resin layer is used to take advantage of the liquid's buoyancy to support overhang structures, thereby enabling rapid printing without collapse of the soft gel material.

Figure 1A:
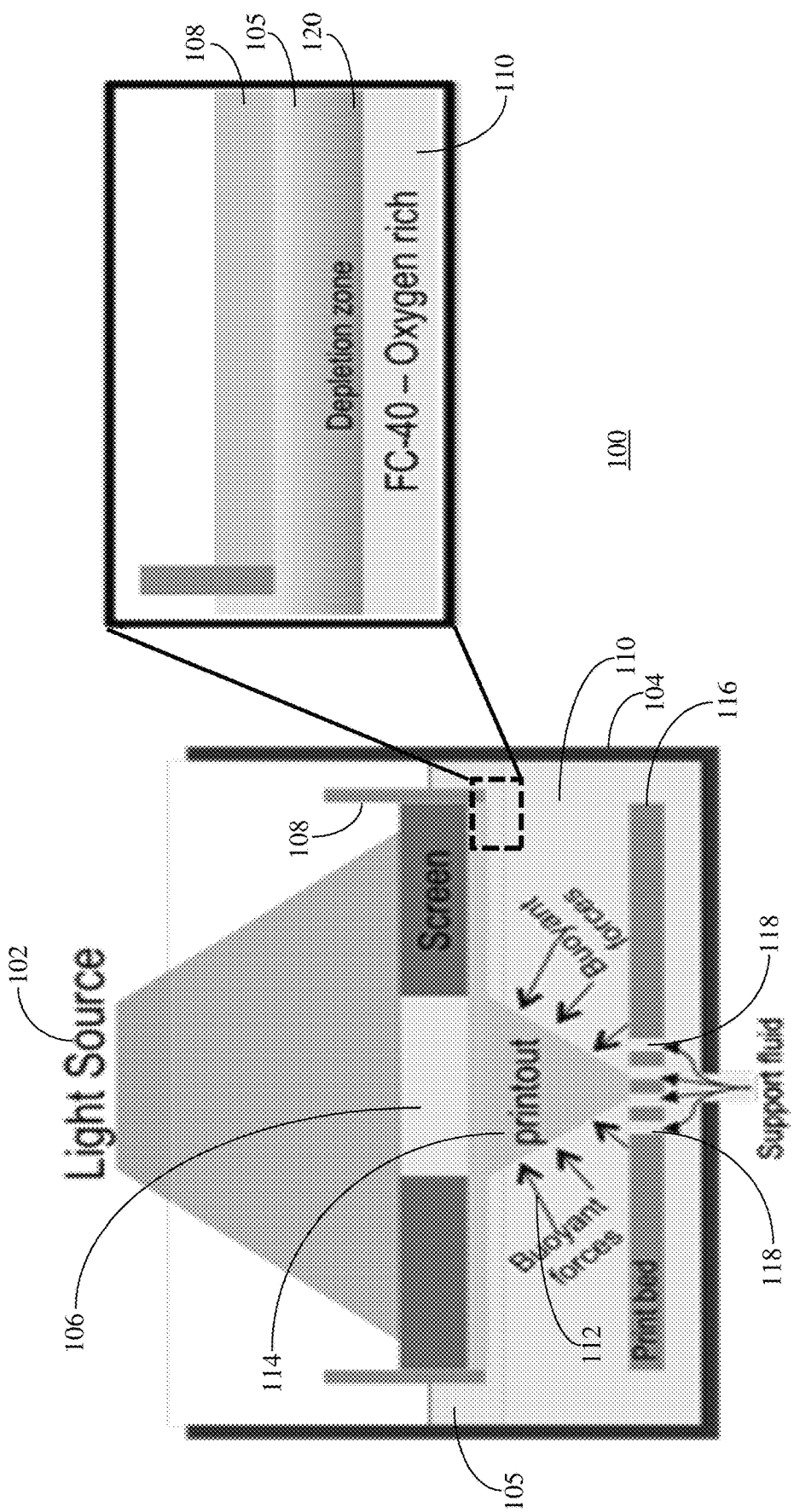

Referring to FIG. 1A, an illustration 100 depicts a system for 3D printing in accordance with a present embodiment. The system for 3D printing includes a light source 102, and a resin tank 104, the resin tank 104 holding a photocrosslinkable resin 105 therein. A mask 106 is disposed between the light source 102 and the resin tank 104 for providing an optical image source by modulating light from the light source 102 to vary the degree and pattern of crosslinking in the photocrosslinkable resin placed in the resin tank 104. In accordance with the present embodiment, the mask 106 is an active matrix mask that can display an image corresponding to the cross-section of the 3D model at a particular z-level.

The mask 106 also includes a vertically displaceable screen 108. In accordance with the present embodiment, the screen 108 is a glass print screen through which the pattern can be projected into the resin and against which the resin is pressed to achieve a thin layer of resin for printing each particular z-level.

A support fluid 110 is provided from a support liquid reservoir (not shown) and, in accordance with the present embodiment, the support fluid 110 immiscible with the resin 105 to provide buoyant force 112 on the printed object 114. The buoyant force 112 is particularly advantageous for printing soft gel material parts as the buoyant force prevents the soft gel material from collapsing under its own weight.

The resin tank 104 includes a stage 116, or print bed, which has a plurality of channels 118 through which the support fluid 110 passes into the resin tank 104 around the printed object 114. In accordance with the present embodiment, a passive pumping system (discussed hereinafter) ensures that a level of the support fluid 110 rises at the same rate as the screen 108, thereby maintaining a constant thickness of the resin 105.

The resin 105 is a photocrosslinkable resin or gel or an initiator system which is sensitive to particular light wavelengths such as commercially-available H-Nu 605IL initiator sensitive to red illumination, commercially-available Eosin Y/TEA/NVP initiator system sensitive to green illumination or commercially-available ZVE200-V470 resin sensitive to blue illumination. In this manner, different resins can be printed simultaneously to fabricate hydrogel or plastic hybrid printed objects 114.

In accordance with the present embodiment, the support fluid 110 is immiscible with the resin 105, such as an oil denser than the resin, to provide the buoyant force 112 on printed parts to prevent collapse of the soft gel material under its own weight. For PEG-diacrylate hydrogel as the resin 105, perfluorinated oil with surfactant as the support fluid 110 displaces excess resin and maintains a thin resin layer. Alternatively, for acrylate resins 105 which can provide more rigid structures, glycerol is suitable for the support fluid 110. In addition, the solubility of oxygen in perfluorinated oil is very high, and, thus, the support fluid 110 also acts as an oxygen reservoir to further limit the crosslinkable resin thickness by creating a depletion zone 120 for improving resolution. In addition, semifluorinated oil could be substituted for the perfluorinated oil.

The screen 108 is preferably a glass plate coated with polydimethylsiloxane (PDMS). The resin 105 is constrained between the support liquid 110 and the screen 108 to reduce the resin layer thickness and improve resolution in the z-direction. The PDMS coating prevents the resin 105 (e.g., the crosslinked gel) from adhering to the screen 108.

In accordance with the present embodiment, the mask 106 is an active matrix which, for example, can be a liquid crystal display (LCD) panel as shown in FIG. 1A with the light source 102 as a high-power LED floodlight. This configuration provides sufficient illumination to crosslink one centimeter thick gels within minutes.

Figure 1B:
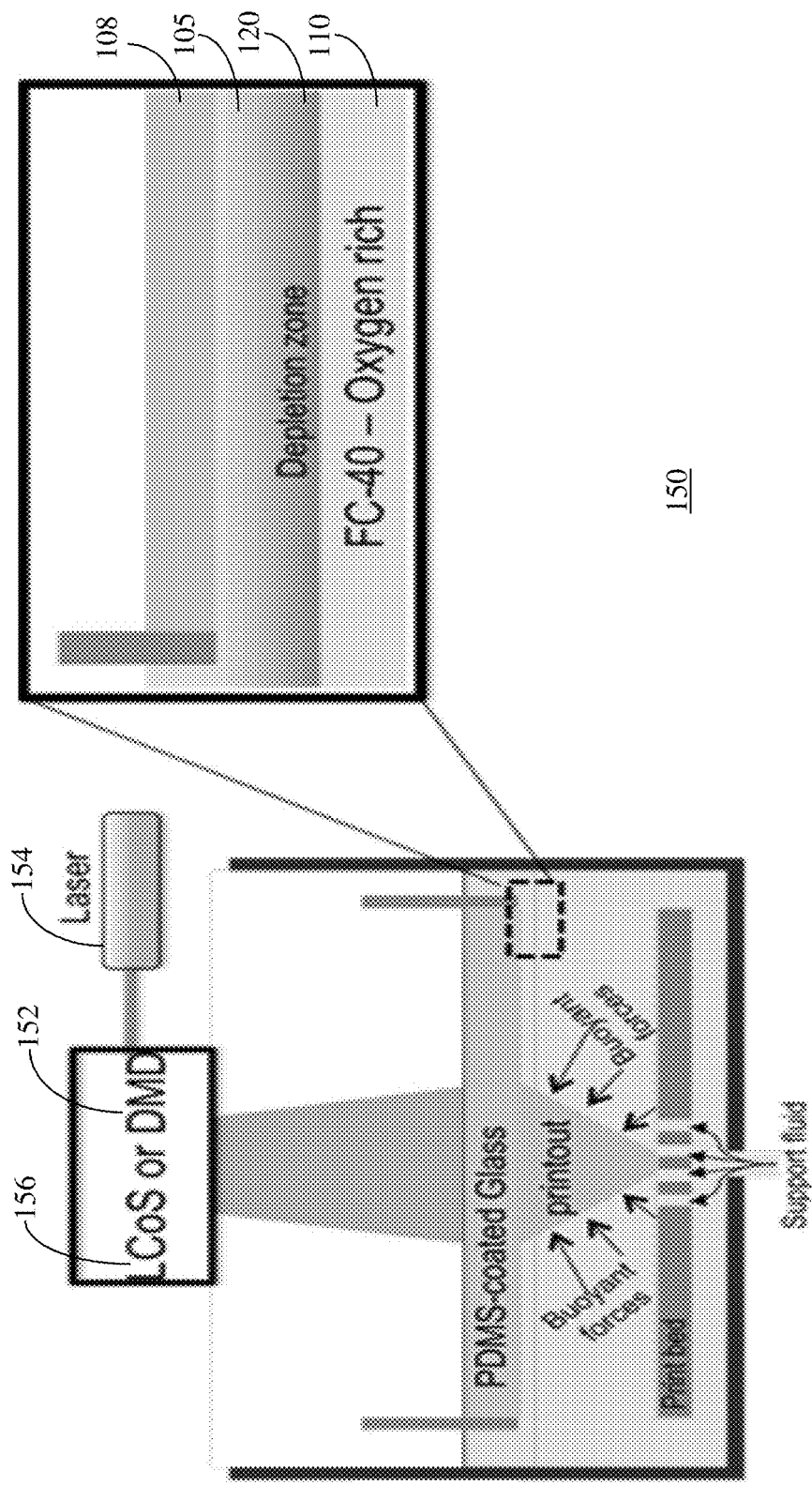

Alternatively, as shown in an illustration 150 of FIG. 1B, a projector utilizing a digital micromirror device (DMD) 152 to direct a laser beam 154 can be used or a projector using a liquid-crystal-on-silicon (LCoS) configuration 156 with laser illumination 154 can be used.

Figure 1C:
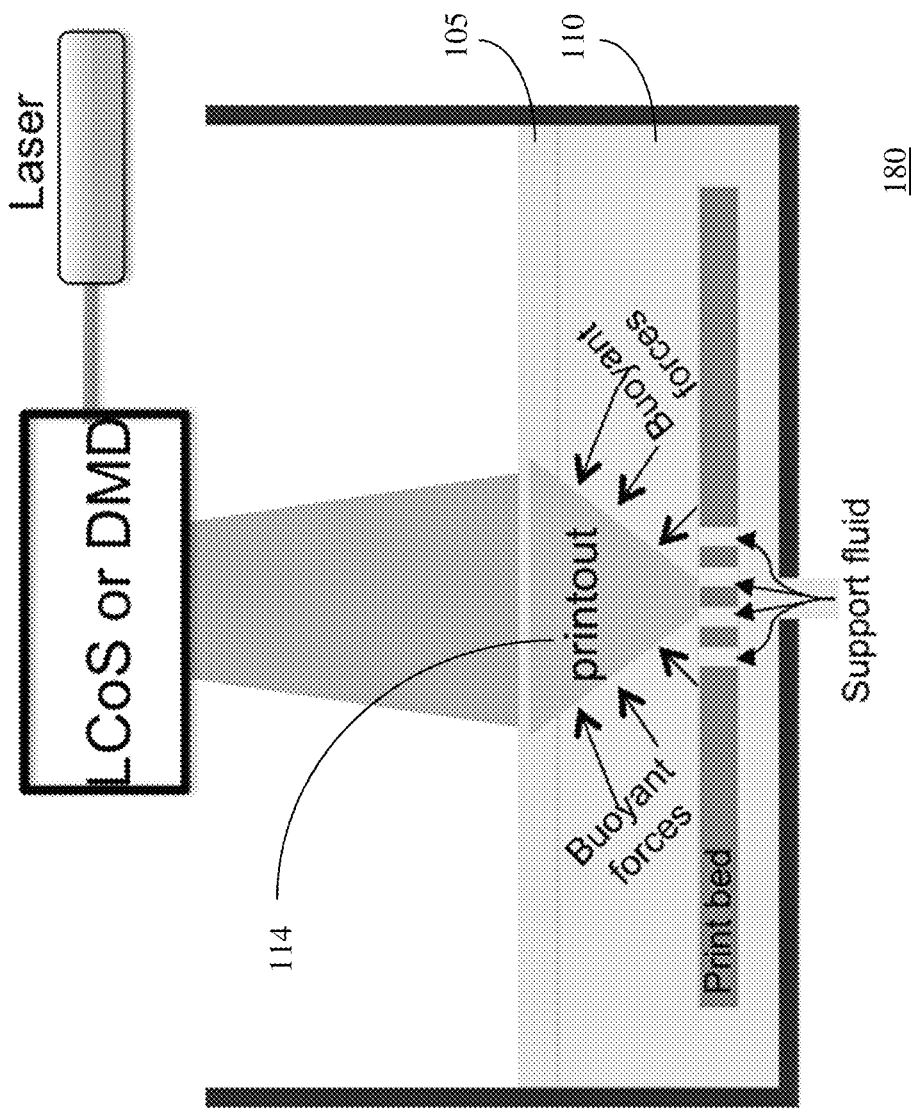

As a further alternate embodiment as shown in an illustration 180 of FIG. 1C, by using a projector to perform the crosslinking reaction, the glass print screen can be removed, and the pattern can be shone directly onto a layer of resin 108 on top of the support fluid 110.

In all cases, the optical image source is connected to a video source (e.g., a laptop, a Raspberry Pi) which is capable of showing black, white and gray images resulting in no crosslinking, complete crosslinking, and partial crosslinking, respectively. This permits gradient porosities and mechanical strengths to be fabricated in a single monolithic printout without any interface.

Figure 2:
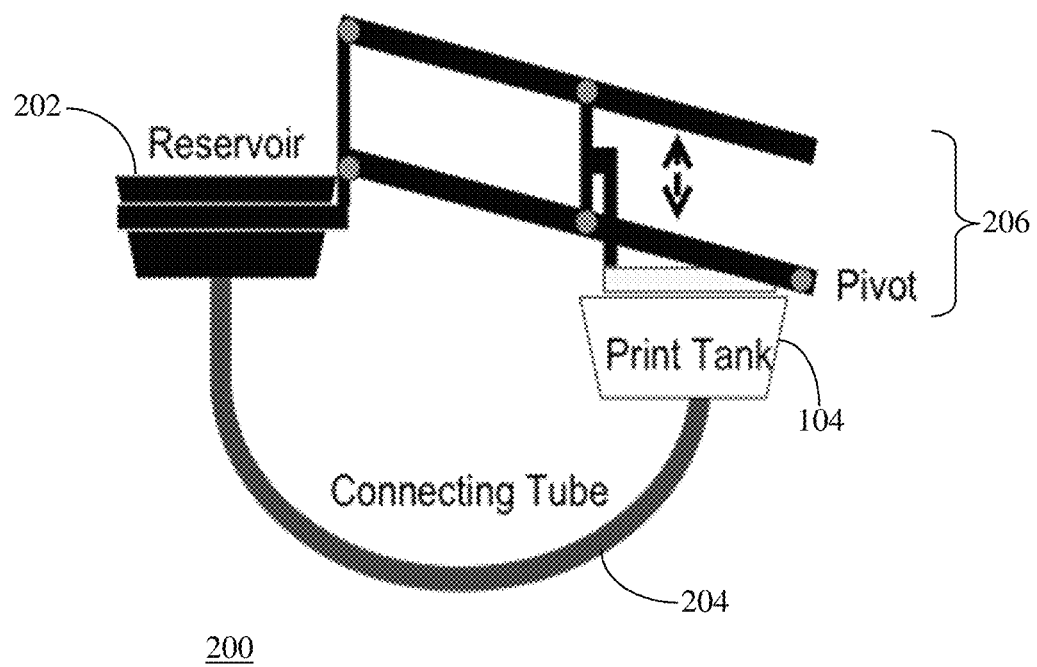
FIG. 2 depicts a side planar view of a support fluid reservoir and print tank system in accordance with the present embodiment.

Referring to FIG. 2, a side planar view 200 depicts the passive pumping system in accordance with the present embodiment. The passive pumping system ensures that the support fluid level rises at the same rate as the screen, thereby maintaining a constant resin thickness. A support fluid reservoir 202 is fluidly connected to the print tank 104 by a connecting tube 204 and mechanically connected to the print tank by a pivoting structure 206. In order to maintain the thickness of the resin throughout the print procedure, it is necessary to ensure that the support fluid level rises at the same rate as a vertical height of a top of the 3D object as the 3D object is printed on the print bed. When a print screen is provided, it is necessary to ensure that the support fluid level rises at the same rate as the print screen. This can be achieved using an active pumping system with fluid level feedback. However, in accordance with the present embodiment, the passive pumping system of FIG. 2 links two tanks of identical dimensions (i.e., the support fluid reservoir 202 and the print tank 104) with the connecting tube 204 and uses the displacement amplifier pivoting structure 206 to ensure that the amount of support fluid 110 transferred from the reservoir 202 to the print tank 104 is correct.

Figure 3A:
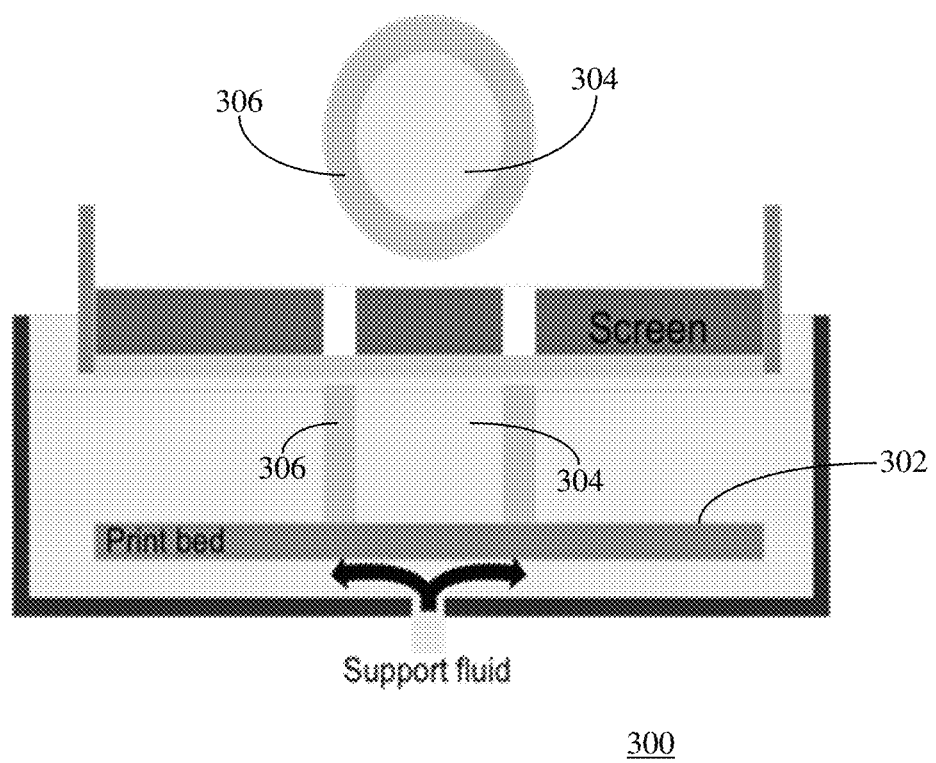

Referring to FIG. 3A, an illustration 300 depicts a closed contour print bed 302. The support fluid 110 flows against and around the print bed 302. Uncured resin 304 is trapped in the print tank 104 by the cured resin 306.

Figure 3B:
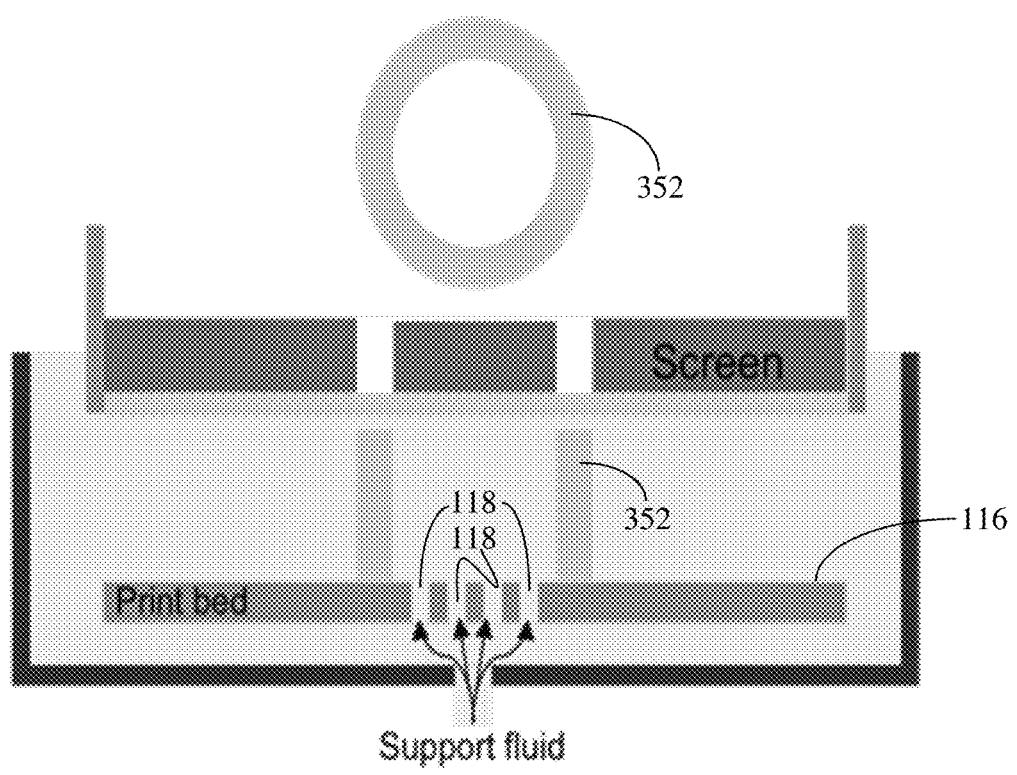

Referring to FIG. 3B, an illustration 350 depicts the print bed 116 that has been chemically modified for adhesion, and has a regular array of holes 118 drilled to provide channels for permitting the support fluid 110 to flow through the print bed. In order for the printout 114 to adhere to the print bed 116, the glass surface is modified with acrylates with which the gel can react. Furthermore, since the support fluid 110 must be able to access enclosed volumes to prevent entrapment of uncured resin, holes 118 are drilled into the print bed 116 glass plates to allow support fluid 110 to flow into the center of closed contours 352.

While the 3D printing system in accordance with the present embodiment is superficially similar to a stereolithography (SLA) method since photocrosslinkable resins are used, important differences exist. First, systems and methods in accordance with the present embodiment maintain a thin crosslinkable resin layer, thereby permitting continuous (and hence rapid) printing of gel material. Conventional SLA is performed using an actuated laser spot to trace out the regions to be crosslinked in each layer. This is a very slow process, resulting in prints that take hours to complete. Newer methods use screens or projectors to display the region to be crosslinked one frame at a time. However, since it is necessary to apply a thin layer of resin to ensure that the displayed pattern is only transferred onto the layer at the correct z-position, the crosslinking is necessarily paused for the application thereby greatly slowing the process resulting in a method that is comparable in speed to the laser actuation approach.

In accordance with the present embodiment, the problem of print speed utilizes the active matrix mask 106 to display a whole frame at one time. Instead of depositing a thin layer of resin 105, a dense support fluid 110 (immiscible with the resin) displaces the excess resin 105 and constrains it to a thin layer between the screen 108 and the support fluid 110. By pumping the support liquid 110 into the print tank 104 at the same rate as the screen 108 is moving up and away from the print bed 116, a constant resin 105 thickness is maintained which defines the layer thickness.

Furthermore, in accordance with the present embodiment, the solubility of oxygen in the support fluid 110 is high (approximately ten to twenty times the solubility of oxygen in water), the support fluid 110 also serves as a source of oxygen to create a depletion zone 120 in the resin 105, further reducing the thickness of the photocrosslinkable layer. In this way, continuous printing is achieved by displaying a sequence of images (i.e. video) on the mask 106.

A second major difference between the present embodiment and conventional 3D printing is the support fluid 110 which takes advantage of buoyancy to support overhang structures, thereby enabling rapid printing without collapse of soft gel material, which may be either partially or fully crosslinked.

While fused deposition modeling (FDM) methods require the use of extensive support structures to support the newly extruded (and liquid) plastic filament (e.g., acrylonitrile butadiene styrene (ABS) or polylactic acid (PLA)) from the heated nozzle, SLA methods can get by with far less support struts since the resin hardens upon crosslinking. However, for soft materials such as gels, a crosslinked part may not have sufficient structural integrity, and may instead collapse under its own weight.

The support fluid 110 serves to prop up overhanging crosslinked gel structures through buoyant forces. Since the support fluid 110 does not adhere to the gel structures, it can be removed by simply rinsing the print out 114. This is far superior to traditional support structures, which need to be removed by physically cutting them away from the final print out.

Thus, it can be seen that the present embodiments provide methods and systems for 3D printing suitable for printing of soft material and soft structures which at a print speed faster than current methods and systems. Such systems and methods are suitable for clinic or hospital environments where wound dressings for deep and/or large wounds can be quickly printed having complex geometries. In addition, such systems and methods of the present embodiment are suitable for tissue engineering as the soft gels can be supported throughout printing by the support fluid 110.

While exemplary embodiments have been presented in the foregoing detailed description of the present embodiments, it should be appreciated that a vast number of variations exist. It should further be appreciated that the exemplary embodiments are only examples, and are not intended to limit the scope, applicability, operation, or configuration of the invention in any way. Rather, the foregoing detailed description will provide those skilled in the art with a convenient road map for implementing exemplary embodiments of the invention, it being understood that various changes may be made in the function and arrangement of steps and method of operation described in the exemplary embodiments without departing from the scope of the invention as set forth in the appended claims.

What is claimed is:

1. A system for printing a three-dimensional (3D) object comprising:
   a resin tank wherein the 3D object is printed, the resin tank including a print bed to form a base of the 3D object;
   an optical image source for modulating light in accordance with a 3D image to vary a degree and pattern of crosslinking in a photocrosslinkable resin in the resin tank;
   a support fluid reservoir comprising a support fluid which is immiscible with the photocrosslinkable resin, wherein the support fluid reservoir is in fluid communication with the resin tank; and
   a pumping structure configured to transfer the support fluid from the support fluid reservoir to the resin tank such that the support fluid rises in the resin tank at a same rate as vertical height of a top of the 3D object as the 3D object is printed on the print bed.

2. The system in accordance with claim 1 further comprising a vertically displaceable screen setting on top of the photocrosslinkable resin in the resin tank, wherein the pumping structure is configured to transfer the support fluid from the support fluid reservoir to the resin tank such that the support fluid rises in the resin tank at a same rate as vertical displacement of the vertical displaceable screen away from the print bed.

3. The system in accordance with claim 2 wherein the support fluid constrictably maintains a crosslinkable layer of the photocrosslinkable resin against the screen for continuously forming a part of the 3D object.

4. The system in accordance with claim 3 wherein the support fluid maintains the crosslinkable layer against the screen until the 3D object is completely printed.

5. The system in accordance with claim 1 wherein the optical image source comprises:
   a light source; and
   a mask disposed between the light source and the resin tank for modulating light from the light source to vary the degree and pattern of crosslinking in the photocrosslinkable resin.

6. The system in accordance with claim 5 wherein the mask comprises a vertically displaceable screen.

7. The system in accordance with claim 5 wherein the mask is an active matrix.

8. The system in accordance with claim 7 wherein the active matrix is a liquid crystal display panel.

9. The system in accordance with claim 1 wherein the optical image source comprises:

a laser illumination; and a liquid-crystal-on-silicon configuration.

10. The system in accordance with claim 2 wherein the vertically displaceable screen comprises a glass plate coated with polydimethylsiloxane (PDMS) to prevent the photocrosslinkable resin from adhering to the glass plate.

11. The system in accordance with claim 1 wherein the photocrosslinkable resin comprises a resin or a gel or an initiator system which is sensitive to particular light wavelengths.

12. The system in accordance with claim 11 wherein the photocrosslinkable resin comprises one or more of H-Nu 605IL initiator which is sensitive to red illumination, Eosin Y/TEA/NVP initiator system which is sensitive to green illumination or ZVE200-V470 resin which is sensitive to blue illumination.

13. The system in accordance with claim 1 wherein the support fluid comprises oxygen for limiting a thickness of the photocrosslinkable resin by creating a depletion zone within the photocrosslinkable resin.

14. The system in accordance with claim 13 wherein the support fluid comprises an oil denser than the resin.

15. The system in accordance with claim 14 wherein the oil comprises a perfluorinated oil with surfactant or semifluorinated oil with surfactant.

16. The system in accordance with claim 1 wherein the pumping structure comprises a passive pumping structure.

17. The system in accordance with claim 1 wherein the print bed is chemically modified for adhesion of the 3D object.

18. The system in accordance with claim 1 wherein the print bed has a plurality of channels formed therein.

\* \* \* \* \*